US 6,996,726 B1

(12) United States Patent
Den Besten et al.

(10) Patent No.: US 6,996,726 B1
(45) Date of Patent: Feb. 7, 2006

(54) MOBILE DATA CARRIER WITH DATA-INDEPENDENT SUPPLY CURRENT AND VOLTAGE

(75) Inventors: Gerrit W. Den Besten, Eindhoven (NL); Jozef L.W. Kessels, Eindhoven (NL); Volker Timm, Pinneberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/623,643

(22) PCT Filed: Dec. 24, 1999

(86) PCT No.: PCT/EP99/10405

§ 371 (c)(1),
(2), (4) Date: Sep. 6, 2000

(87) PCT Pub. No.: WO00/41130

PCT Pub. Date: Jul. 13, 2000

(30) Foreign Application Priority Data

Jan. 7, 1999 (DE) ................................. 199 00 261
Jan. 7, 1999 (EP) .................................. 99100168

(51) Int. Cl.
*G06F 1/26* (2006.01)
(52) U.S. Cl. ....................................... 713/300; 713/320
(58) Field of Classification Search ................. 713/300, 713/320; 323/220, 224, 268; 235/492
See application file for complete search history.

(56) References Cited

U.S. PATENT DOCUMENTS 5,326,965 A * 7/1994 Inoue .......................... 235/492
5,406,064 A * 4/1995 Takahashi .................... 235/492
5,495,241 A * 2/1996 Donig et al. ............ 340/870.39
5,804,811 A * 9/1998 Saitoh et al. ................. 235/492
5,998,978 A * 12/1999 Connell et al. ............. 323/273
6,027,029 A * 2/2000 Kim ............................. 235/492
6,035,357 A * 3/2000 Sakaki ........................ 710/301
6,118,306 A * 9/2000 Orton et al. ................... 327/44
6,134,130 A * 10/2000 Connell et al. ................ 363/89
6,173,899 B1 * 1/2001 Rozin .......................... 235/492
6,321,067 B1 * 11/2001 Suga et al. .................. 455/41.2
6,507,913 B1 * 1/2003 Shamir ........................ 713/200

FOREIGN PATENT DOCUMENTS

EP            0874327 A2  * 10/1998

OTHER PUBLICATIONS

Sloan et al. "Examining smart-card security under the threat of power analysis attacks" Computers, IEEE Transactions on page(s): 541-552 vol.: 51, Issue: 5, May 2002.*

* cited by examiner

*Primary Examiner*—Chun Cao
(74) *Attorney, Agent, or Firm*—Adam L. Stroud

(57) ABSTRACT

Disclosed is a mobile data carrier comprising a data-processing circuit; and a supply unit (1) to apply electric energy to power supply terminals for operating the data-processing circuit from an external energy source and (2) controlling voltage and current at external access points of the data carrier, wherein the supply unit including a voltage-limiting control circuit arranged in parallel to the power supply terminals of the data-processing circuit, and a current control device which, with respect to the supply of energy to the data-processing circuit, is arranged in series with the parallel arrangement of the voltage-limiting control circuit and the data-processing circuit.

2 Claims, 4 Drawing Sheets

MOBILE DATA CARRIER WITH DATA-INDEPENDENT SUPPLY CURRENT AND VOLTAGE

The invention relates to a mobile data carrier, particularly a chip card. Such chip cards have also become known as smart cards.

To enable unauthorized persons to investigate data stored on such data carriers, a method has been publicized in which data patterns processed in the data-processing circuit can be inferred from the variation with respect to time of a power supply voltage at the power supply terminals of a data-processing circuit within the data carrier and from the variation with respect to time of a power supply current taken up by the data-processing circuit at the power supply terminals.

It is an object of the invention to at least considerably complicate the investigation of data patterns by means of the above-mentioned method in a mobile data carrier, or to even render this impossible.

According to the invention, this object is achieved by a mobile data carrier, particularly a chip card, comprising a data-processing circuit and a supply unit for applying electric energy to power supply terminals for operating the data-processing circuit from an external energy source arranged outside the data carrier, the supply unit comprising a voltage-limiting control circuit which is arranged parallel to the power supply terminals of the data-processing circuit, and a current control device which, with respect to the supply of energy to the data-processing circuit, is arranged in series with the parallel arrangement of the voltage-limiting control circuit and the data-processing circuit.

Due to the invention, it is achieved in a simple and advantageous manner that an external energy source arranged outside the data carrier constantly feeds a constant flow of energy into the data carrier. The voltage and the current with which this flow of energy is realized are always constant during the whole operation at circuit points which are accessible from outside the data carrier and thus do not allow any inference from individual data-processing operations within the data-processing circuit. Particularly, it can no longer be concluded from the energy flow in a bit-precise manner whether a special computation has taken place.

For the mobile data carrier according to the invention, particularly contactless or also contacted chip cards, the invention has the function of a power supply source with the characteristics that, at the receiving end of the path in the arrangement, via which the energy flow for the data-processing circuit is realized, the load is independent of the load on the supplying side of this path, and that the source on the supplying side behaves as a current source via a large control range. Such a power supply source can be constructed by means of a parallel control device. Particularly, the contactless energy supply of a chip card has the characteristic of a constant current source which does not have to be controlled.

An advantageous further embodiment of the mobile data carrier according to the invention is characterized in that the current control device is adapted to supply an at least substantially load-independent supply current, and in that the voltage-limiting control circuit is adapted to take up an excess current which, with respect to the power supply current, is complementary to a power supply current taken up by the data-processing circuit at the power supply terminals.

In accordance with a further advantageous embodiment, the mobile data carrier according to the invention is characterized in that the supply current supplied by the current control device is at least substantially controlled in dependence upon only one voltage supplied by the external energy source.

A further possibility of inference in the investigation method mentioned in the opening paragraph for a mobile data carrier is provided in that, in a data-processing circuit, synchronously clocked logic elements are used in the data carrier, which elements are strictly controllable with respect to time with the aid of the synchronous clock signal. This time control simplifies the assignment of bit patterns to the data-processing operations in the case of an unauthorized access.

In accordance with a preferred further embodiment, the mobile data carrier according to the invention is characterized in that the data-processing circuit is implemented with asynchronously operating logic elements whose signal-processing rate is dependent on a power supply voltage applied to the power supply terminals of the data-processing circuit.

By using asynchronously operating logic elements in the data-processing circuit of the mobile data carrier according to the invention, there may be confusion in the case of unauthorized access. Switching processes which are transferred by such asynchronously operating logic elements to the power supply terminals of the data-processing circuit generate a pattern which cannot be correlated and from which conclusions with respect to processed data patterns cannot be made. Advantageously, the signal-processing rate of the logic elements is dependent on the power supply voltage. The passage of data of the data-processing circuit is thus automatically adapted to the available power supply voltage. A data-processing circuit formed in this way can function in a wide power supply voltage range while using a comparably small number of components.

In this embodiment, the mobile data carrier according to the invention has the further advantage that there is no interference of signals from the data-processing circuit with signals externally applied to the mobile data carrier or signals supplied to the exterior by the mobile data carrier. The protection against the investigation method mentioned in the opening paragraph is very high because the electromagnetic radiation of the data-processing circuit in mobile data carriers does not even comprise information about data patterns in the data-processing circuit. The power supply current taken up by the mobile data carrier is independent of the processed data patterns. Dependent on the power output of the energy supply to the mobile data carrier, the processing rate in the data-processing circuit is always adjusted to the optimally possible value. As against an implementation of the data-processing circuit with synchronously clocked logic elements, an essentially smaller dimensioned filter capacitor may be particularly used for interference suppression. As regards the investigation of data patterns in the data-processing circuit, an encryption of the time ranges is achieved, in which the data input and output operations and computations are performed. It may be achieved that it is no longer possible to determine from the exterior when an actual computing process or an input or output operation takes place.

These and other aspects of the invention are apparent from and will be elucidated with reference to the embodiments described hereinafter.

Figure 1:
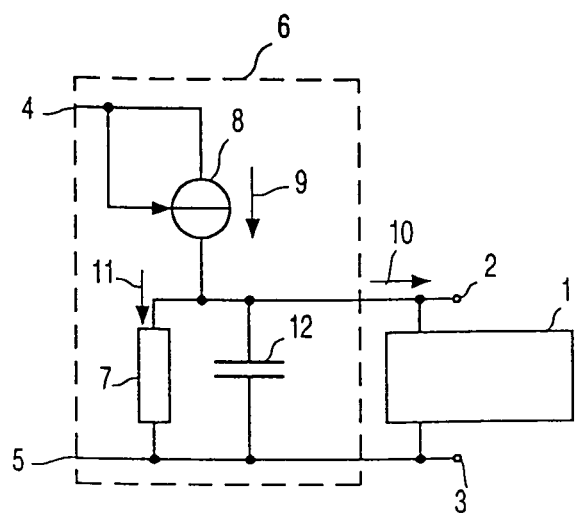
FIG. 1 is a block diagram of a first embodiment.

The arrangement shown in FIG. 1 comprises a data-processing circuit 1 with two power supply terminals 2, 3. A power supply voltage is supplied via these terminals to the data-processing circuit 1, which power supply voltage serves for the supply of energy to the data-processing circuit 1. Electric energy is applied via two terminals 4, 5 from an external energy source (not shown) arranged outside the data carrier. The terminals 4, 5 are connected, for example, to a circuit arrangement which rectifies a transmitted electric voltage in a contactless chip card and makes this rectified voltage available for energy supply to the data-processing circuit 1.

The terminals 4, 5 constitute inputs of a supply unit 6 which comprises a voltage-limiting control circuit 7 and a current control device 8. The voltage-limiting control circuit 7 is arranged parallel to the power supply terminals 2, 3. The current control device 8 is arranged in series with the parallel circuit of the voltage-limiting control circuit 7 and the data-processing circuit 1. This series arrangement is arranged between the terminals 4 and 5. The current control device 8 is adapted to supply an at least substantially load-independent supply current which is denoted in FIG. 1 by means of the arrow with the reference numeral 9. At least in a given control range, the current control device 8 thus has the behavior of an at least substantially ideal current source. The supply current 9 may be controlled by a voltage which is present between the terminals 4 and 5 so as to adapt the energy supply for the data-processing circuit 1 to this voltage between the terminals 4 and 5.

The data-processing circuit 1 is preferably formed with asynchronous logic elements whose signal-processing rate is dependent on the available supply current 9 as a maximum power supply current at the power supply terminals 2, 3. Dependent on the operations performed in the data-processing circuit 1, however, the power supply current, denoted by means of arrow 10 in FIG. 1, will be smaller than the supply current 9. An excess current, shown by way of arrow 11 in FIG. 1, and being complementary to the power supply current 10 with respect to the supply current 9 is depleted through the voltage-limiting control circuit 7. The supply current 9 can therefore be dimensioned data-independently. Moreover, a capacitor 12 is arranged parallel to the power supply terminals 2, 3, which capacitor, particularly in contactless chip cards, is used for avoiding interferences between signals in the data-processing circuit 1 and signals which are received externally or transmitted to the exterior by the chip card. In the embodiment of the mobile data carrier according to the invention, this capacitor 12 may be dimensioned to be very small.

The voltage-limiting control circuit 7 not only has the function of taking up the excess current 11 but also the function of keeping the power supply voltage at the power supply terminals 2, 3 within a predetermined voltage range. The capacitor 12 also serves to average, i.e. compensate load peaks in the data-processing circuit 1. Since these may already be strongly reduced by using asynchronous logic elements, only a small capacitor is required for this purpose.

In the construction shown in FIG. 1, a control loop is not necessary for controlling data-dependent power supply currents, which control loop constantly has a finite control rate and thus, as regards construction, cannot realize a complete suppression of such data dependencies in the energy supply. In the mobile data carrier according to the invention, the supply current 9 is completely constant without any data dependence. Due to the voltage-limiting operation of the control circuit 7, it is achieved that the current control device 8 also remains within its control range at fluctuating power supply currents so that the supply current 9 can be maintained constant.

Due to the control by the current control device 8 after the voltage at the terminals 4, 5, the supply current 9 can be adapted to the power supply current/power supply voltage characteristic of the data-processing circuit 1.

Figure 2:
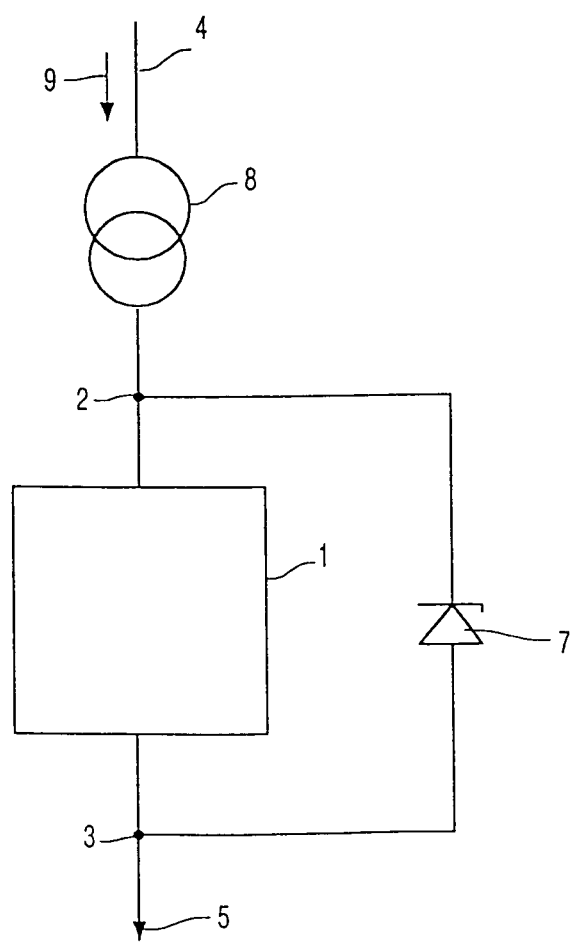
FIG. 2 is a block diagram of a second embodiment.

FIG. 2 is a simplified block diagram, in which elements corresponding to those in FIG. 1 have the same reference numerals. The voltage-limiting control circuit 7 is represented by a zener diode in this case, and the current control device 8 is represented by an ideal current source. This current source is shown as an uncontrolled, i.e. non-adjustable current source. The power supply voltage for the data-processing circuit is maintained constant by the zener diode 7 in a wide range of the energy supply via the terminals 4, 5, as well as for the signal-processing operations in the data-processing circuit 1.

Figure 3:
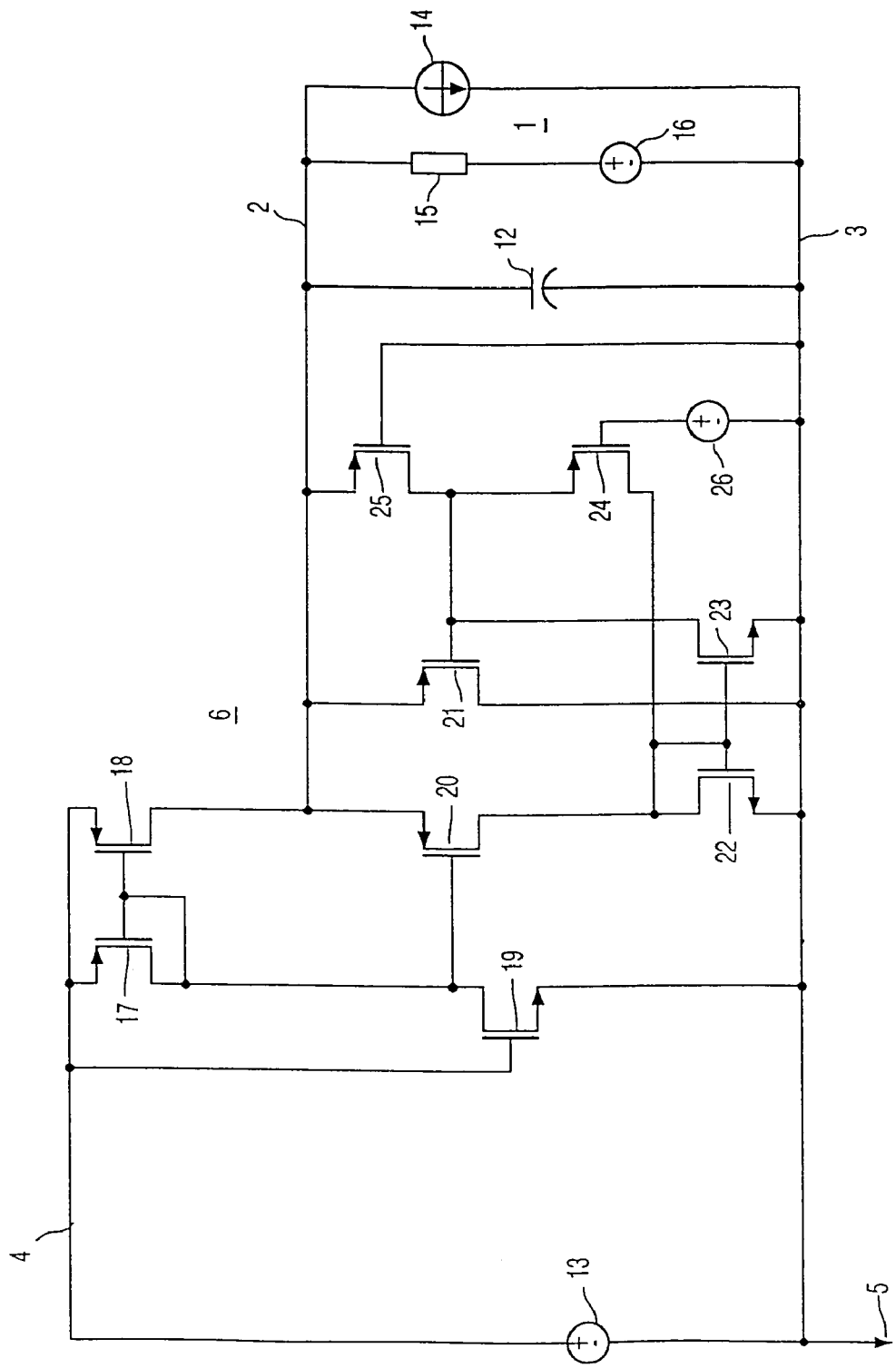
FIG. 3 is a detailed representation of a third embodiment.

The embodiment in FIG. 3 is a more detailed representation of the supply unit 6. Circuit elements already described are denoted again by the same reference numerals. The energy supply via the terminals 4, 5 is effected from a voltage source 13 shown diagrammatically. As an equivalent circuit diagram for the data-processing circuit 1, the parallel arrangement of a current source 14 with the series arrangement of a resistor 15 and a voltage source 16 is shown.

The supply unit 6 shown in FIG. 3 comprises a first and a second transistor 17, 18 whose sources are connected to the terminal 4. The gate of the second transistor 18 is connected to the gate of the first transistor 17 and to its drain. The first and second transistors 17, 18 constitute a current mirror.

The drain of a third transistor 19 is connected to the drain of the first transistor 17 and to a gate of a fourth transistor 20. The gate of the third transistor 19 is connected to the terminal 4. A source of the third transistor 19 is connected to the terminal 5.

The source of the fourth transistor 20 is connected to the drain of the second transistor 18 and to the power supply terminal 2. A drain of the fourth transistor 20 is connected to a drain of a sixth transistor 22 and its gate is connected to a gate of a seventh transistor 23 and to a drain of an eighth transistor 24. The sources of the sixth and seventh transistors 22, 23 are jointly connected to the terminal 5 so that the sixth and seventh transistors 22, 23 also constitute a current mirror. The source of a fifth transistor 21 is connected to the power supply terminal 2 and its drain is connected to the terminal 5, while its gate is connected to the drain of the seventh transistor 23. Moreover, there is a connection between the gate of the fifth transistor 21 and the source of the eighth transistor 24 as well as the drain of a ninth transistor 25. A source of the ninth transistor 25 is also connected to the power supply terminal 2. While a gate of the ninth transistor 25 is directly connected to the power supply terminal 3, the gate of the eighth transistor 24 is connected to this power supply terminal 3 via a reference source 26.

Figure 4:
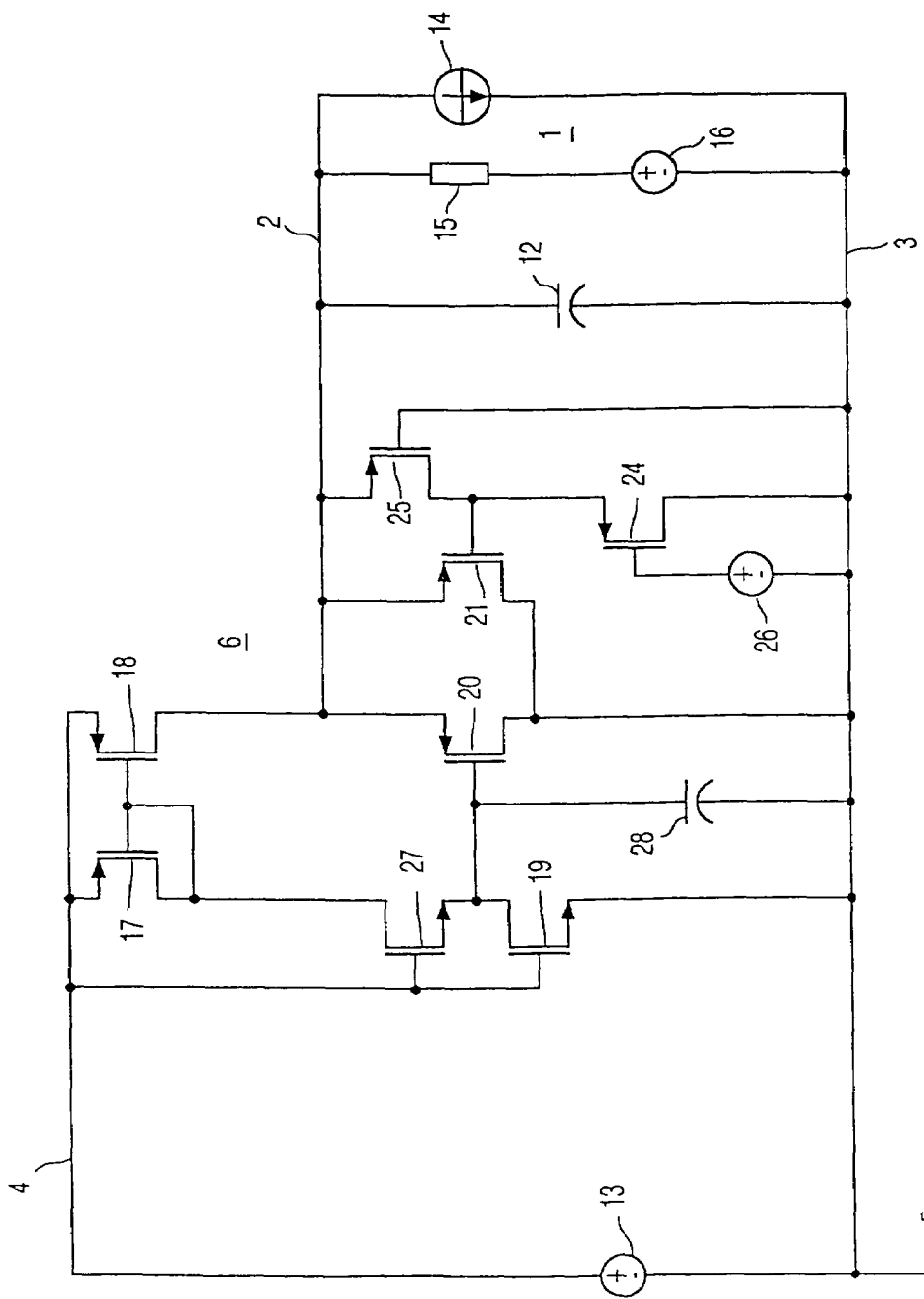
FIG. 4 is a detailed representation of a fourth embodiment.

FIG. 4 is a modification of the embodiment in FIG. 3, in which elements already shown in FIG. 3 are denoted by the same reference numerals. As compared with FIG. 3, the circuit arrangement in FIG. 4 includes a tenth transistor 27 whose gate is connected to the gate of the third transistor 19. The source-drain path of the tenth transistor 27 is incorporated in the connection between the third and the first transistor 19 and 17 in such a way that the drains of the tenth and the first transistor 27, 17 are connected together and the source of the tenth transistor 27 is connected to the drain of the third transistor 19 as well as the gate of the fourth transistor 20. A second capacitor 28 is arranged between the gate of the fourth transistor 20 and the terminal 5.

As compared with FIG. 3, the current mirror of the sixth transistor 22 and the seventh transistor 23 is omitted in FIG. 4. Consequently, the drain of the fourth transistor 20 is directly connected to the terminal 5. Also the drain of the eighth transistor 24 is directly connected to the terminal 5.

Figure 5:
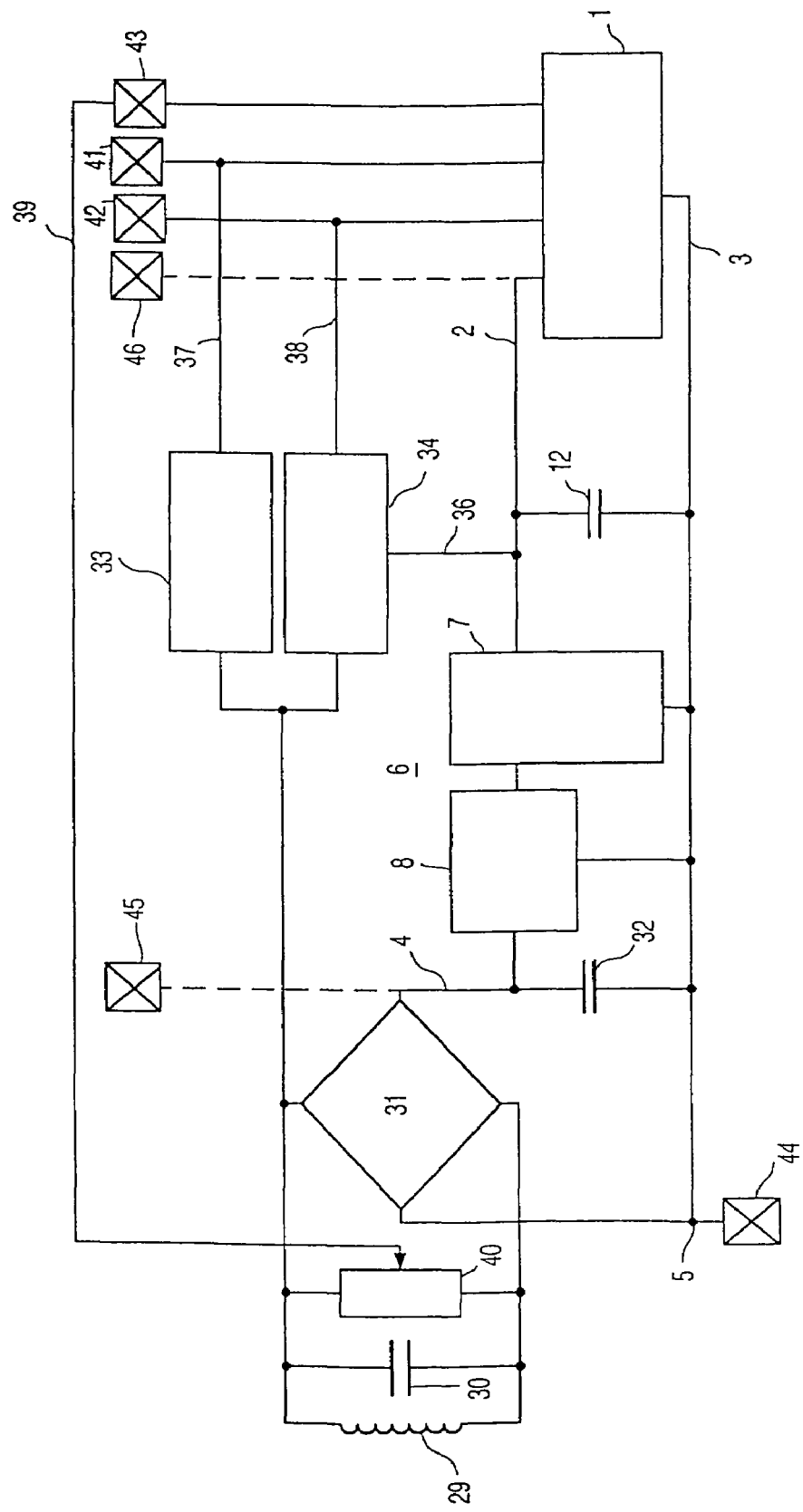
FIG. 5 is a block diagram of a mobile data carrier according to the invention.

FIG. 5 is a block diagram of an embodiment of a mobile data carrier according to the invention, which is adapted both for contacted and contactless connections. Elements corresponding to elements from the previously described Figures have the same reference numerals.

For contactless energy supply and data transmission, the data carrier of FIG. 5 comprises a resonant circuit of an inductance 29 and a third capacitor 30. When high-frequency electric energy is applied via the resonant circuit 29, 30, a voltage is generated therein, which is applied to the terminals 4, 5 via a rectifier arrangement 31. A fourth capacitor 32 which is connected to the terminals 4, 5 is used for sieving and smoothing the voltage at the terminals 4, 5. The energy is supplied to the data-processing circuit 1 via the current control device 8 and the voltage-limiting control circuit 7.

The data carrier shown in FIG. 5 further comprises a clock preparation circuit 33 and a data preparation circuit 34 both of which receive data and clock signals applied via the resonant circuit 29, 30 for separating and signal formation via a line 35. The clock preparation circuit 33 and the data preparation circuit 34 are also supplied with energy from the supply unit 6, which is shown diagrammatically by way of the connection 36 in FIG. 5. Clock signals and data signals are applied to the data-processing circuit 1 via a clock line 37 and a data line 38, respectively.

For the supply of data signals by the data-processing circuit 1, these data signals are applied to a modulation device 40 via a further data line 39, which modulation device influences, for example, the resonant circuit 29, 30 via a load modulation.

For a contacted connection of the mobile data carrier as shown in FIG. 5 with external arrangements for data transmission and energy supply, the clock line 37 is connected to a first contact 41, the data line 38 is connected to a second contact 42, the further data line 39 is connected to a third contact 43 and the terminal 5 is connected to a fourth contact 44. For the purpose of energy supply, a fifth contact 45 is provided which is connected to the terminal 4. In this way, fluctuations of the power supply current at the power supply terminals 2, 3 do not reach the exterior of the mobile data carrier via the fifth contact 45. This would be the case when instead of the fifth contact 45 a sixth contact 46 were provided which is directly connected to the power supply terminal 2. Direct detections of fluctuations of the power supply current for the data-processing circuit 1 would be possible via such a sixth contact 46.

What is claimed is:

1. A mobile data carrier comprising:
    a data-processing circuit that includes asynchronously operating logic elements whose signal-processing rate is dependent on a power supply voltage applied to the data-processing circuit,
    a voltage regulator, operably coupled in parallel with the data-processing circuit, that is configured to control the power supply voltage applied to the data-processing circuit, and
    a current source, operably coupled in series between the data-processing circuit and a power source that is configured to provide a supply current to the data-processing circuit and the voltage regulator, wherein
    the current source includes:
        a first transistor that includes:
            a gate that is connected to a first node of the power source,
            a drain through which a first current flows, and
            a source that is connected to a second node of the power source, and
        a current mirror that is configured to provide a multiple of the first current as the supply current.

2. The mobile data carrier of claim 1, wherein
    the current mirror includes a second transistor and a third transistor having commonly connected gates.

* * * * *